(12) United States Patent
Brusseau et al.

(10) Patent No.: US 12,319,764 B2
(45) Date of Patent: Jun. 3, 2025

(54) FLEXIBLE PVDF POLYMERS

(71) Applicant: SOLVAY SPECIALTY POLYMERS ITALY S.P.A., Bollate (IT)

(72) Inventors: Ségolène Brusseau, Tavaux (FR); Julio A. Abusleme, Saronno (IT); Giambattista Besana, Mariano Comense (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 75 days.

(21) Appl. No.: 16/762,911

(22) PCT Filed: Nov. 21, 2018

(86) PCT No.: PCT/EP2018/082108
§ 371 (c)(1),
(2) Date: May 8, 2020

(87) PCT Pub. No.: WO2019/101806
PCT Pub. Date: May 31, 2019

(65) Prior Publication Data
US 2021/0171681 A1    Jun. 10, 2021

(30) Foreign Application Priority Data
Nov. 24, 2017   (EP) .................... 17306633

(51) Int. Cl.
| | |
|---|---|
| C08F 214/22 | (2006.01) |
| B29C 43/00 | (2006.01) |
| B29C 43/18 | (2006.01) |
| B29C 48/08 | (2019.01) |
| H01M 50/406 | (2021.01) |
| H01M 50/42 | (2021.01) |
| H01M 50/426 | (2021.01) |
| B29K 27/00 | (2006.01) |

(52) U.S. Cl.
CPC ....... *C08F 214/225* (2013.01); *H01M 50/406* (2021.01); *H01M 50/42* (2021.01); *H01M 50/426* (2021.01); *B29C 43/18* (2013.01); *B29C 48/08* (2019.02); *B29K 2027/16* (2013.01); *C08F 2500/17* (2013.01); *C08F 2500/26* (2013.01)

(58) Field of Classification Search
CPC .. C08F 214/225; H01M 50/426; B29C 48/08; B29C 43/00; B29K 2027/16
See application file for complete search history.

(56) References Cited

U.S. PATENT DOCUMENTS

2014/0120269 A1 * 5/2014 Abusleme ............ H01M 50/411
427/532

FOREIGN PATENT DOCUMENTS

| KR | 20170084597 A | 7/2017 | |
|---|---|---|---|
| WO | 2007006645 A1 | 1/2007 | |
| WO | 2007006646 A1 | 1/2007 | |
| WO | 2008129041 A1 | 10/2008 | |
| WO | 2012084578 A1 | 6/2012 | |
| WO | 2012175418 A1 | 12/2012 | |
| WO | WO-2014074264 A1 * | 5/2014 | ......... A61F 13/4902 |
| WO | 2018114779 A1 | 6/2018 | |

* cited by examiner

*Primary Examiner* — Catherine S Branch
(74) *Attorney, Agent, or Firm* — Osha Bergman Watanabe & Burton LLP

(57) ABSTRACT

The present invention pertains to vinylidene fluoride copolymers having improved flexibility, said copolymers comprising recurring units derived from hydrophilic (meth) acrylic monomers and from perhalogenated monomers, to a process for the manufacture of said copolymers, and to their use in applications where outstanding flexibility is required.

16 Claims, No Drawings

FLEXIBLE PVDF POLYMERS

CROSS-REFERENCE TO RELATED APPLICATIONS

This application is a U.S. national stage entry under 35 U.S.C. § 371 of International Application No. PCT/EP2018/082108 filed Nov. 21, 2018, which claims priority to European application No. 17306633.3, filed on Nov. 24, 2017. The entire contents of these applications are explicitly incorporated herein by this reference.

TECHNICAL FIELD

The present invention pertains to vinylidene fluoride copolymers having improved flexibility, said copolymers comprising recurring units derived from hydrophilic (meth) acrylic monomers and from perhalogenated monomers, to a process for the manufacture of said copolymers, and to their use in applications where outstanding flexibility is required.

BACKGROUND ART

Fluoropolymers are known in the art to be excellent materials used in a variety of applications and environments due to their intrinsic chemical resistance and good mechanical properties.

Thermoplastic fluoropolymers can be extruded or solution casted to form films that can be used for example in lithium ion batteries as binder for the electrodes and for the separator.

Examples of such fluorinated polymeric materials are polyvinylidene fluoride homopolymers (PVDF) and vinylidene fluoride (VDF) copolymer resins, such as poly (vinylidene fluoride-chlorotrifluoroethylene) (VDF-CTFE), poly(vinylidene fluoride-tetrafluoroethylene) (VDF-TFE), poly(vinylidene fluoride-hexafluoropropylene) (VDF-HFP) and poly(vinylidene fluoride-trifluoroethylene) (VDF-TrFE).

In some recent applications, such as in flexible batteries, fluoropolymer in the form of thin films must be bended several times during the life-time in a given structure or device.

Fluoropolymers characterized by a very high flexibility while keeping the mechanical properties and the chemical resistance of the fluoropolymer itself are thus needed.

Another property desired for fluoropolymer films used in some of said applications is the good adhesion to a given substrate, mainly to a metal substrate.

In some devices where coating a metal film with a polymer film is needed, good adhesion and low temperature flexibility are both required.

VDF copolymers comprising recurring units derived from hydrophilic (meth)acrylic monomers (e.g. acrylic acid) are well known in the art.

EP2147029 30 Oct. 2008, discloses VDF linear copolymers comprising recurring units derived from hydrophilic (meth)acrylic monomers randomly distributed throughout the whole VDF backbone, which exhibit improved thermal stability.

Such copolymers have been developed aiming at adding to the mechanical properties and chemical inertness of VDF homopolymers suitable adhesion towards metals, e.g. aluminium or copper, or hydrophilic properties.

It is however known that the chemical resistance of VDF copolymers is higher when the crystallinity of said copolymers is high, and that the crystallinity of VDF copolymers decreases as the modification with monomers different from VDF increases.

One aim of the present invention is to provide a VDF copolymer that can be manufactured in the form of film having good flexibility, chemical resistance and good adhesion to substrates, especially to metal substrates.

SUMMARY OF INVENTION

It has been now surprisingly found that certain VDF copolymers are endowed with excellent flexibility, measured as MIT flex-life, and good adhesion to metal substrates, while maintaining the good intrinsic mechanical and chemical properties of VDF homopolymers.

Therefore, an object of the present invention is a semi-crystalline fluoropolymer (polymer (F)) comprising:
 recurring units derived from vinylidene fluoride (VDF),
 recurring units derived from at least one hydrophilic (meth)acrylic monomer (MA) of formula (I):

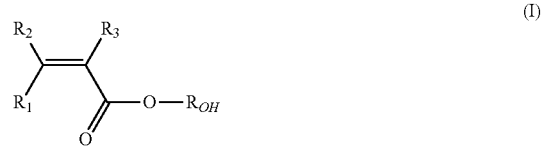

wherein:
 $R_1$, $R_2$ and $R_3$, equal to or different from each other, are independently selected from a hydrogen atom and a $C_1$-$C_3$ hydrocarbon group, and
 $R_{OH}$ is a hydrogen atom or a $C_1$-$C_5$ hydrocarbon moiety comprising at least one hydroxyl group,
 in an amount of from 0.05% to 2% by moles, preferably from 0.1 to 1.2% by moles, more preferably from 0.2 to 1.0% by moles, with respect to the total amount of moles of recurring units in said polymer (F);
 recurring units derived from at least one perhalogenated monomer (FM) in an amount of from 0.5% to 5.0% by moles, preferably from 1.5 to 4.5% by moles, more preferably from 1.5% to 3.0% by moles, even more preferably from 2.0 to 3.0% by moles with respect to the total amount of moles of recurring units in said polymer (F),
said polymer (F) having an intrinsic viscosity measured in dimethylformamide at 25° C. higher than 0.35 l/g, preferably higher than 0.38 l/g.

In another aspect, the present invention provides a film of polymer (F), said film being characterized by improved flex life.

In a further aspect, the present invention provides a method for the preparation of a film of polymer (F).

DESCRIPTION OF EMBODIMENTS

The Applicant has surprisingly found that the VDF copolymers of the present invention, despite including modifying (meth)acrylic and perhalogenated monomers, possess good flexibility while maintaining an excellent adhesion to substrates such as metal current collectors and separators.

The term "semi-crystalline" is intended to denote a polymer having a heat of fusion of more than 1 J/g when measured by Differential Scanning calorimetry (DSC) at a heating rate of 10° C./min, according to ASTM D 3418, more preferably of at least 8 J/g. As used herein, the terms "adheres" and "adhesion" indicate that two layers are permanently attached to each other via their surfaces of contact.

As used herein, a "flexible" product, such as a flexible film or a flexible battery, is a solid non-rigid object having a shape that is adjustable with no more than hand force to produce the shape change.

By the term "recurring unit derived from vinylidene difluoride" (also generally indicated as vinylidene fluoride, 1,1-difluoroethylene or VDF), it is intended to denote a recurring unit of formula (I):

Non-limitative examples of hydrophilic (meth)acrylic monomers (MA) of formula (I) include, notably:
acrylic acid (AA)
(meth)acrylic acid,
hydroxyethyl(meth)acrylate (HEA),
2-hydroxypropyl acrylate (HPA),
hydroxyethylhexyl(meth)acrylate,
and mixtures thereof.

The hydrophilic (meth)acrylic monomer (MA) preferably complies with formula (II) here below:

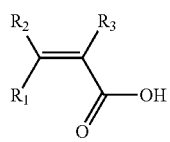

wherein each of $R_1$, $R_2$ and $R_3$, equal to or different from each other, is independently a hydrogen atom or a $C_1$-$C_3$ hydrocarbon group.

Still more preferably, the hydrophilic (meth)acrylic monomer (MA) is acrylic acid (AA).

By the term "perhalogenated monomer (FM)" it is intended to denote an halogenated recurring unit being free of hydrogen atoms.

In the rest of the text, the expression "perhalogenated monomer" is understood, for the purposes of the present invention, both in the plural and the singular, that is to say that they denote both one or more than one halogenated monomers as defined above.

In a preferred embodiment, the perhalogenated monomer is selected from the group consisting of chlorotrifluoroethylene (CTFE), hexafluoropropylene (HFP), tetrafluoroethylene (TFE).

More preferably, the perhalogenated monomer is a perfluorinated monomer, preferably selected from HFP and TFE.

The at least one perhalogenated monomer (FM) is preferably HFP.

The inventors have found that best results are obtained when the polymer (F) is a linear semi-crystalline co-polymer.

The term "linear" is intended to denote a co-polymer made of substantially linear sequences of recurring units from (VDF) monomer, (meth)acrylic monomer and perhalogenated monomer (FM); polymer (F) is thus distinguishable from grafted and/or comb-like polymers.

The inventors have found that a substantially random distribution of monomer (MA) and monomer (FM) within the polyvinylidene fluoride backbone of polymer (F) advantageously maximizes the effects of the monomer (MA) and of monomer (FM) on adhesiveness and flex life of the resulting copolymer, without impairing the other outstanding properties of the vinylidene fluoride polymers, e.g. thermal stability and mechanical properties.

The polymer (F) is typically obtainable by emulsion polymerization or suspension polymerization of at least one VDF monomer, at least one hydrogenated (meth)acrylic monomer (MA) and at least one perhalogenated monomer (FM), according to the procedures described, for example, in WO 2007/006645 and in WO 2007/006646.

In a preferred embodiment of the invention, in polymer (F) the hydrophilic (meth)acrylic monomer (MA) of formula (I) is comprised in an amount of from 0.2 to 1.0% by moles with respect to the total moles of recurring units of polymer (F), and the at least one perhalogenated monomer (FM) is comprised in an amount of from 1.0 to 4.0% by moles with respect to the total moles of recurring units of polymer (F).

More preferably, the hydrophilic (meth)acrylic monomer (MA) is a hydrophilic (meth)acrylic monomer of formula (II), still more preferably it is acrylic acid (AA), and the perhalogenated monomer (FM) is HFP, and polymer (F) is a VDF-AA-HFP terpolymer.

Polymer (F) is typically provided in the form of powder.

Preferably, the intrinsic viscosity of polymer (F), measured in dimethylformamide at 25° C., is lower than 0.70 l/g, preferably lower than 0.60 l/g, more preferably lower than 0.50 l/g.

In a preferred embodiment of the invention, the intrinsic viscosity of polymer (F), measured in dimethylformamide at 25° C., is comprised between 0.35 l/g and 0.45 l/g.

Flexible films of polymer (F) can be obtained, said films being flexible enough to be used in products which undergo dynamic flexing at low temperatures, such as flexible lithium-ion batteries.

Moreover, thanks to the composition comprising certain amounts of monomer (MA) and of monomer (FM), polymer (F) is endowed with high adhesion to different substrates, metal in particular.

In another object of the present invention it is thus provided a film of polymer (F), said film being characterized by improved flexibility.

The film of polymer (F) may be prepared by casting, by compression moulding or by extruding polymer (F) at a temperature of at least 200° C. between two foils of an inert support.

Preferably, the inert support is a metal support.

In a preferred embodiment, the film of polymer (F) may be prepared by compression moulding between two foils of aluminium at a temperature of about 240° C.

Suitably, the film of polymer (F) has a thickness comprised between 5 and 500 micrometers.

The main targeted uses of the polymers (F) of the invention, and of films of polymers (F), are for use in lithium ion batteries, flexible lithium ion batteries in particular, as binder for the electrodes and for separators.

In particular, when the polymers (F) of the invention are used for the preparation of binders for electrodes of lithium ion batteries, they may suitably be dissolved in a proper organic solvent and homogenized with an electro-active material and all other suitable components to produce a paste to be applied to a metal collector.

The choice of the organic solvent is not particularly limited provided that it is suitable for solubilising the polymer (F).

The organic solvent is typically selected from the group consisting of:
alcohols such as methyl alcohol, ethyl alcohol and diacetone alcohol, ketones, such as acetone, methylethylketone, methylisobutyl ketone, diisobutylketone, cyclohexanone and isophorone, linear or cyclic esters such as isopropyl acetate, n-butyl acetate, methyl acetoacetate, dimethyl phthalate and γ-butyrolactone, linear or cyclic amides such as N,N-diethylacetamide, N,N-dimethylacetamide, dimethylformamide and N-methyl-2-pyrrolidone, and dimethyl sulfoxide.

According to an embodiment of the present invention, a binder for electrodes of lithium ion batteries is prepared by using a solution of a polymer (F) that is a terpolymer VDF-AA-HFP including the perhalogenated monomer HFP in an amount preferably from 1.5 to 4.5% by moles dissolved in a ketone.

Very good results have been obtained when the ketones is a linear aliphatic ketone having a standard boiling point lower than 120° C., preferably lower than 100° C., more preferably lower than 70° C., preferably acetone.

The use of ketones in the preparation of binders for electrodes of lithium ion batteries advantageously enables avoiding use of toxic and polluting solvents and thus eliminating cost, safety and environmental concerns related to handling of large volume of said solvents.

Should the disclosure of any patents, patent applications, and publications which are incorporated herein by reference conflict with the description of the present application to the extent that it may render a term unclear, the present description shall take precedence.

The invention will be now described in more detail with reference to the following examples, whose purpose is merely illustrative and not limitative of the scope of the invention.

Experimental Part

Raw Materials

Polymer (C1): VDF-AA (0.9% by moles) polymer having an intrinsic viscosity of 0.30 l/g in DMF at 25° C., obtained as described in WO 2008/129041.

Polymer (C2): VDF-AA (0.7% by moles) polymer having an intrinsic viscosity of 0.38 l/g in DMF at 25° C., obtained as described in WO 2008/129041.

Initiator agent (A): t-amyl-perpivalate in isododecane (a 75% by weight solution of t-amyl perpivalate in isododecane), commercially available from Arkema.

Suspending agent (B): ethyl hydroxyethyl cellulose derivative, commercially available as Bermocoll® E 230 FQ from AkzoNobel.

Suspending agent (C): hydroxypropyl methylcellulose derivative, commercially available as Methocel® K100 GR from Dow.

Example 1: Preparation of Polymer (F-B)

In a 4 litres reactor equipped with an impeller running at a speed of 650 rpm were introduced in sequence 2122 g of demineralised water and 0.79 g of suspending agent B. The reactor was purged with sequence of vacuum (30 mmHg) and purged of nitrogen at 20° C. Then 3.91 g of initiator agent (A) were introduced. At a speed of 880 rpm, 0.67 g of acrylic acid (AA) and 160 g of hexafluoropropylene (HFP) were introduced. Finally, 1165 g of vinylidene fluoride (VDF) was introduced in the reactor. The reactor was gradually heated until a set-point temperature of 50° C. and the pressure was fixed at 120 bars. The pressure was kept constantly equal to 120 bars by feeding 875 g of aqueous solution with a concentration of AA at 8.4 g/kg during the polymerization. After this feeding, no more aqueous solution was introduced and the pressure started to decrease. The polymerization was stopped by degassing the reactor until reaching atmospheric pressure. A conversion at 76% of monomers was reached. The polymer so obtained was then recovered, washed with demineralised water and dried at 65° C. during all the night.

Polymer (F-B): VDF-AA (0.5% by moles)-HFP (3.0% by moles) polymer having an intrinsic viscosity of 0.42 l/g in DMF at 25° C.

Example 2: General Procedure for the Preparation of Polymers (F-A), (C3), (C4) and (C5)

In a 80 litres reactor equipped with an impeller running at a speed of 250 rpm were introduced, in sequence, the demineralised water, initiator agent (A) and suspending agent (B) or suspending agent (C), as specified in Table 1.

TABLE 1

| Polymer | Initiator Agent A g/kgMnT | Suspending agent B g/kgMnT | Suspending agent C g/kgMnT |
|---|---|---|---|
| C3 | 7.0 | | 0.6 |
| C4 | 3.0 | 0.6 | |
| C5 | 3.0 | 0.6 | |
| F-A | 2.6 | 0.6 | |

The reactor was purged with sequence of vacuum (30 mmHg) and purged of nitrogen at 20° C. Then initiator agent (A) was added. Only for the polymer (C3), 299.7 g of diethyl carbonate was added in the reactor. The speed of the stirring was increased at 300 rpm. Finally, acrylic acid (AA, Initial amount) and hexafluoropropylene (HFP) monomers were introduced in the reactor, followed by vinylidene fluoride (VDF). The amounts of monomers and temperature conditions are specified in Table 2.

The reactor was gradually heated until a set-point temperature at fixed temperature as described in the table and the pressure was fixed at 110 for polymer (C3) and at 120 bar for the preparation of all the other polymers. The pressure was kept constantly equal to 110 or 120 bar by feeding a certain amount of AA (Feeding amount) diluted in an aqueous solution with a concentration of AA as specified in Table 1 ([AA] in water). After this feeding, no more aqueous solution was introduced and the pressure started to decrease. Then, the polymerization was stopped by degassing the reactor until reaching atmospheric pressure. In general a conversion between around 74% and 85% of comonomers was obtained. The polymer so obtained was then recovered, washed with demineralised water and oven-dried at 65° C.

TABLE 2

| Polymer | Water kg | VDF kg | HFP kg | AA Initial g | AA feeding g ([AA] in water g/kg water) | T ° C. |
|---|---|---|---|---|---|---|
| C3 | 59 | 16.7 | 1.9 | 8.8 | 178.5 (14) | 56 |
| C4 | 50.4 | 22.7 | 2.5 | 21.6 | 234 (14.3) | 52 |
| C5 | 51.4 | 21.7 | 3.6 | 8.5 | 204 (12.5) | 52 |
| F-A | 46.1 | 25.3 | 3.5 | 14.7 | 159 (8.4) | 50 | g/MnT means grams of product per Kg of the total amount of the comonomers (HFP, AA and VDF) introduced during the polymerization.

Example 3: General Procedure for the Preparation of Films

The polymer was compression moulded between two aluminium foils at a temperature of 240° C. to produce a film of about 350 microns thickness.

Example 4: General Procedure of Evaluation of Adhesion of the Polymer to Metal The polymer was molded between two metal foils at a temperature of 240° C. for 10 min. The polymer layer was about 300-350 microns of thickness. Then the three layers piece was cooled down to room temperature. The degree of adhesion was tested by the operator. If no need or little force was needed to separate the three layers, it means (recorded) that there is no adhesion. Otherwise, if strong force was needed, it means the adhesion is good.

In all examples, except with polymer (C3), good adhesion towards the aluminium used to produce the films was observed.

Example 5: Determination of Intrinsic Viscosity of Polymer (F)

Intrinsic viscosity ($\eta$) [l/g] of the polymers of the examples was measured using the following equation on the basis of dropping time, at 25° C., of a solution obtained by dissolving the polymer (F) in N,N-dimethylformamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/l], $\eta_r$ is the relative viscosity, i.e. the ratio between the dropping time of sample solution and the dropping time of solvent, $\eta_{sp}$ is the specific viscosity, i.e. $\eta_r-1$, and $\Gamma$ is an experimental factor, which for polymer (F) corresponds to 3.

The values of intrinsic viscosity of the polymers according to the invention (F-A and F-B) and of the comparative polymers (C1, C2, C3, C4 and C5) are shown in Table 2.

Example 6: M.I.T. Flex Life Measurement of Polymer (F)

The films of polymers prepared as described in Example 3 were tested in a M.I.T machine (Folding Indurance Tester from Tinius Olsen, testing machine Co, Willow Growe, (PA)) at 23° C. at a speed of 90 cycles/min with a weight of 2 lbs. The test was considered over when the sample collapsed.

The value of MIT Flex life is an average of the values obtained by testing at least three films for each polymer.

In Table 3 the data of flex life for the three comparative polymers (C1), (C2), (C3), (C4) and (C5) and of two polymers (F) according to the present invention (F-A and F-B) are reported.

TABLE 3

| Example (Polymer) | Flex life No cycles up to collapse | MP (II) ° C. | Viscosity @25° C. DMF, l/g | NMR HFP mol % | NMR AA mol % | Adhesion |
|---|---|---|---|---|---|---|
| F-A | 88842 | 147.2 | 0.37 | 2.8 | 0.5 | Good |
| F-B | 144222 | 146 | 0.42 | 3.0 | 0.5 | Good |
| C1 | 5971 | 162.5 | 0.30 | — | 0.9 | Good |
| C2 | 3088 | 163.4 | 0.38 | — | 0.7 | Good |
| C3 | 9360 | 155.6 | 0.10 | 2.5 | 0.7 | No adhesion |
| C4 | 49903 | 148.4 | 0.31 | 2.3 | 0.8 | Good |
| C5 | 94193 | 144.1 | 0.30 | 3.4 | 0.6 | Good |

As shown in Table 3, the polymer (F) of the present invention as notably embodied by any of the polymers (F-A) and (F-B), advantageously exhibits higher flex life in comparison with the comparative polymers (C1), (C2), (C3) and (C4).

Polymer (F-A) shows a flex life that is comparable to that of (C5), despite including a lower amount of HFP.

Without wishing to be bound by any theory, the inventors believe that the combination of higher intrinsic viscosity with the presence of a certain amount of the perhalogenated monomer is responsible for the improvement in flexibility of the polymer (F).

In view of the above, it has been found that the polymer (F) of the present invention or any films thereof is particularly suitable for use in flexible lithium ion batteries as binder for the electrodes separator.

The invention claimed is:

1. A semi-crystalline fluoropolymer (polymer (F)) comprising:
   recurring units derived from vinylidene fluoride (VDF),
   recurring units derived from at least one hydrophilic (meth) acrylic monomer (MA) of formula (I):

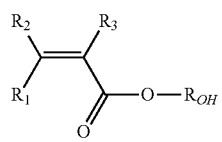

(I)

$R_1$, $R_2$ and $R_3$, equal to or different from each other, are independently selected from a hydrogen atom and a $C_1$-$C_3$ hydrocarbon group, and
   $R_{OH}$ is a hydrogen atom,
   in an amount of from 0.2% to 1.0% by moles with respect to the total amount of moles of recurring units in said polymer (F); and
   recurring units derived from at least one perhalogenated monomer (FM) in an amount of from 1.5% to 5.0% by moles with respect to the total amount of moles of recurring units in said polymer (F),
   said polymer (F) having an intrinsic viscosity greater than 0.38 l/g measured in dimethylformamide at a concentration of 0.2 g/dl and at 25° C.

2. The polymer (F) according to claim 1 wherein the at least one hydrophilic (meth) acrylic monomers (MA) of formula (I) is selected from the group consisting of acrylic acid (AA), (meth) acrylic acid, and mixtures thereof.

3. The polymer (F) according to claim 1 wherein the perhalogenated monomer (FM) is selected from the group consisting of chlorotrifluoroethylene (CTFE), hexafluoropropylene (HFP) and tetrafluoroethylene (TFE).

4. The polymer (F) according to claim 1 that is a terpolymer VDF-AA-HFP.

5. The polymer (F) according to claim 1 having intrinsic viscosity, measured in dimethylformamide at 25° C., lower than 0.70 l/g.

6. The polymer (F) according to claim 5 having intrinsic viscosity, measured in dimethylformamide at 25° C., that is comprised between 0.38 l/g and 0.45 l/g.

7. The polymer (F) according to claim 1, wherein the at least one hydrophilic (meth) acrylic monomer (MA) is comprised in an amount of from 0.3 to 1.0% by moles with respect to the total moles of recurring units of polymer (F), and the at least one perhalogenated monomer (FM) is comprised in an amount of from 1.0 to 4.0% by moles with respect to the total moles of recurring units of polymer (F).

8. A polymer (F) according to claim 1 in the form of a film.

9. A film of polymer (F) according to claim 8 having a thickness of from 5 to 500 micrometers.

10. A process for the preparation of the film of polymer (F) according to claim 8, said process comprising casting a polymer (F) at a temperature of at least 200° C. between two foils of an inert support.

11. A process for the preparation of the film of polymer (F) according to claim 8, said process comprising compression moulding polymer (F) at a temperature of at least 200° C. between two foils of an inert support.

12. A process for the preparation of the film of polymer (F) according to claim 8, said process comprising extruding polymer (F).

13. The polymer (F) according to claim 1 comprising:
the recurring units derived from vinylidene fluoride (VDF); and
the recurring units derived from at least one perhalogenated monomer (FM) in an amount of from 1.5 to 4.5% by moles with respect to the total amount of moles of recurring units in said polymer (F).

14. The polymer (F) according to claim 1 comprising:
the recurring units derived from vinylidene fluoride (VDF); and
the recurring units derived from at least one perhalogenated monomer (FM) in an amount of from 2.0 to 3.0% by moles with respect to the total amount of moles of recurring units in said polymer (F).

15. The polymer (F) according to claim 1, wherein the hydrophilic (meth) acrylic monomer (MA) is acrylic acid (AA) and the perhalogenated monomer (FM) is hexafluoropropylene (HFP).

16. The polymer (F) according to claim 5, said polymer (F) having an intrinsic viscosity, measured in dimethylformamide at 25° C., lower than 0.50 l/g.

* * * * *